US010835066B2

(12) United States Patent
Morgan et al.

(10) Patent No.: US 10,835,066 B2
(45) Date of Patent: Nov. 17, 2020

(54) PROCESS AND APPARATUS FOR FORMING OVERWRAP CONTAINER USING CLAMPING AND REFORMING

(71) Applicant: Paper Machinery Corporation, Milwaukee, WI (US)

(72) Inventors: Mark J. Morgan, Menomonee Falls, WI (US); Michael S. Kazmierski, Cudahy, WI (US); Ronald J. Wilson, Kewauskum, WI (US)

(73) Assignee: Paper Machinery Corporation, Milwaukee, WI (US)

( * ) Notice: Subject to any disclaimer, the term of this patent is extended or adjusted under 35 U.S.C. 154(b) by 492 days.

(21) Appl. No.: 15/586,536

(22) Filed: May 4, 2017

(65) Prior Publication Data

US 2017/0340149 A1 Nov. 30, 2017

Related U.S. Application Data

(60) Provisional application No. 62/340,730, filed on May 24, 2016, provisional application No. 62/356,630, filed on Jun. 30, 2016.

(51) Int. Cl.
*A47G 19/22* (2006.01)
*B65D 3/22* (2006.01)
(Continued)

(52) U.S. Cl.
CPC .......... *A47G 19/2288* (2013.01); *B31B 50/62* (2017.08); *B65D 3/06* (2013.01);
(Continued)

(58) Field of Classification Search
CPC . B31B 50/62; B31B 2110/20; B31B 2110/10; B31B 2120/501;
(Continued)

(56) References Cited

U.S. PATENT DOCUMENTS 3,547,012 A * 12/1970 Nicholas ................. B29C 69/00 493/109
4,452,596 A * 6/1984 Clauss .................. B31F 1/0054 493/107
(Continued)

FOREIGN PATENT DOCUMENTS

DE 8301046 U1 5/1983
DE 202004005114 U1 8/2005
(Continued)

OTHER PUBLICATIONS

International Search Report for PCT/EP2006/008753 dated Jan. 15, 2007.
(Continued)

*Primary Examiner* — Sameh Tawfik
(74) *Attorney, Agent, or Firm* — Andrus Intellectual Property Law, LLP

(57) ABSTRACT

A method for forming an overwrap container includes the steps of a) providing a base container having a first side seam on a side wall that extends along a longitudinal axis to define an internal volume, and a bottom secured to the side wall; b) providing the side wall of the base container with connecting elements on an outer periphery of the side wall; c) providing an overwrap having a second side seam over the side wall of the base container such that the overwrap is joined in spaced apart relationship by the connecting elements to the side wall of the base container; d) clamping the overwrap to the base container along the second side seam to form a first compressed area; e) clamping the overwrap to the base container in an area 180° removed from the second side seam to form a second compressed area: and f) reforming the second compressed area to define an overwrap container having a substantially uniform spacing and air gap
(Continued)

between the base container and the overwrap except in the first compressed area.

11 Claims, 8 Drawing Sheets

(51) Int. Cl.

| | |
|---|---|
| ***B65D 81/38*** | (2006.01) |
| ***B31B 50/62*** | (2017.01) |
| ***B65D 3/06*** | (2006.01) |
| *B31B 105/00* | (2017.01) |
| *B31B 120/50* | (2017.01) |
| *B31B 110/10* | (2017.01) |
| *B31B 110/20* | (2017.01) |

(52) U.S. Cl.
CPC ........... *B65D 3/22* (2013.01); *B65D 81/3869* (2013.01); *B31B 2105/0022* (2017.08); *B31B 2110/10* (2017.08); *B31B 2110/20* (2017.08); *B31B 2120/501* (2017.08)

(58) Field of Classification Search
CPC .... B31B 2105/0022; B65D 3/06; B65D 3/22; B65D 81/3869; A47G 19/2288
USPC .......................................... 493/111, 153, 105
See application file for complete search history.

(56) References Cited

U.S. PATENT DOCUMENTS

| | | | | |
|---|---|---|---|---|
| 5,073,161 | A * | 12/1991 | Weder | A01G 9/02 493/154 |
| 5,524,817 | A * | 6/1996 | Meier | B65D 3/22 229/4.5 |
| 5,547,124 | A * | 8/1996 | Mueller | B65D 3/22 220/592.17 |
| 5,950,917 | A * | 9/1999 | Smith | B65D 3/22 220/903 |
| 5,992,489 | A * | 11/1999 | Busse | B31D 1/005 156/443 |
| 6,196,454 | B1 | 3/2001 | Sadlier | |
| 6,401,955 | B1 | 6/2002 | Yang | |
| 7,281,650 | B1 * | 10/2007 | Milan | B65D 3/22 229/4.5 |
| 7,686,753 | B2 | 3/2010 | Konzal | |
| 7,717,325 | B2 | 5/2010 | Puls et al. | |
| 7,905,821 | B2 * | 3/2011 | Stahlecker | B31F 1/0038 493/152 |
| 8,146,796 | B2 | 4/2012 | D'Amato | |
| 8,146,797 | B2 | 4/2012 | D'Amato | |
| 8,387,857 | B2 | 3/2013 | Messerschmid | |
| 8,393,886 | B2 | 3/2013 | D'Amato | |
| 8,490,792 | B2 | 7/2013 | D'Amato | |
| 8,608,018 | B2 | 12/2013 | Babinsky et al. | |
| 8,794,294 | B2 | 8/2014 | D'Amato | |
| 8,807,339 | B2 | 8/2014 | D'Amato | |
| 8,932,428 | B2 | 1/2015 | D'Amato | |
| 10,398,242 | B2 * | 9/2019 | Bonney | A47G 19/2288 |
| 2005/0029337 | A1 * | 2/2005 | Van Handel | B29C 61/02 229/403 |
| 2005/0115975 | A1 | 6/2005 | Smith et al. | |
| 2006/0237465 | A1 | 10/2006 | D'Amato | |
| 2008/0264937 | A1 | 10/2008 | D'Amato | |
| 2008/0280743 | A1 * | 11/2008 | Stahlecker | B65D 3/22 493/106 |
| 2009/0218390 | A1 * | 9/2009 | Chang | B31D 1/005 229/403 |
| 2010/0065622 | A1 * | 3/2010 | Chang | B65D 3/22 229/403 |

FOREIGN PATENT DOCUMENTS

| | | | |
|---|---|---|---|
| EP | 1227043 | B1 | 6/2004 |
| FR | 2533894 | A1 | 4/1984 |
| JP | H0465232 | A | 3/1992 |
| JP | 2000109144 | | 4/2000 |
| JP | 2000142834 | | 5/2000 |
| JP | 2000142835 | A | 5/2000 |
| JP | 2004315065 | A | 11/2004 |
| JP | 2005263275 | | 9/2005 |
| WO | 2007028623 | A1 | 3/2007 |
| WO | 2007054179 | A2 | 5/2007 |
| WO | 2008042378 | | 4/2008 |

OTHER PUBLICATIONS

International Search Report and Written Opinion for PCT/US2016/031733 dated Jul. 15, 2016.
International Preliminary Report on Patentability for International Application PCT/US2017/031009 dated Dec. 6, 2018.
International Search Report and Written Opinion for International Application PCT/US2017/031009 dated Aug. 10, 2017.

* cited by examiner

PROCESS AND APPARATUS FOR FORMING OVERWRAP CONTAINER USING CLAMPING AND REFORMING

CROSS-REFERENCE TO RELATED APPLICATIONS

The present utility application relates to and claims priority to U.S. Provisional Application No. 62/340,730 filed May 24, 2016 and U.S. Provisional Application No. 62/356,630 filed Jun. 30, 2016, the disclosures of which are hereby incorporated herein in entirety.

FIELD

The present disclosure relates generally to thermally insulated containers, including cups, for storing hot and cold beverages and other consumable food products. More particularly, the present disclosure pertains to thermally insulated containers wherein the container or cup is configured with a double wall construction, and wherein an air gap is provided between the individual walls of the double wall construction.

BACKGROUND

The Assignee of the instant application, Paper Machinery Corporation of Milwaukee, Wis. U.S.A. is the manufacturer of paper cup making machines used to make a variety of cups and containers. A typical cup machine for making paper cups, for instance, includes a turret having a plurality of mandrels about which the containers are formed. The turret sequentially rotates the mandrels into cooperation with a variety of work stations where numerous cup forming procedures occur.

In an exemplary procedure, a circular bottom blank is cut out at one work station and attached to the end of a mandrel by a vacuum applied through the mandrel. During this procedure, the outside lip of the bottom blank is folded downwardly. At a subsequent work station, a side wall blank is wrapped around a mandrel. The side wall blank is heated and sealed using a seam clamp along an overlapped side seam which runs generally longitudinally along the side of the cup. Typically, a paperboard or solid plastic sheet is coated with a thermoplastic such as polyethylene, so the bottom and side wall blanks may be heated and sealed together. In some applications, the side wall blank extends beyond the lip of the bottom blank, and this flap is bent over the lip. At a bottom finishing station, the flap is pressed against the lip from an inside recessed area of the bottom of the cup. By heating the polyethylene and firmly pressing the side wall flap and the bottom blank lip together, a bottom seal is formed and the cup is provided with a sturdy bottom region having a recessed area. There may also be other work stations where various other additional cup forming procedures are carried out. For example, one station may be used to provide a curl at the top or rim of the cup to provide a more functional drinking container and a better appearance.

Cups and containers produced according to the procedure outlined above typically do not have the ability to keep beverages and food products stored therein warm and, at the same time, protect the hand from becoming uncomfortable from holding a hot liquid or material. Similarly, such cups and containers do not have the ability to insulate a cold beverage or products and protect the exterior of the cold container from moisture condensation that may pool on the bottom of the container.

Many cups and containers have been produced with sleeves, overwraps or laminates to provide a thermally insulated double walled cup or container with an air gap between inner and outer walls to create hand-held protection in addition to heat and cold retention in the beverage or food product contained therein.

In development of the present disclosure, the inventors have discovered difficulties arise in creating a desired air gap between the inner and outer walls of the container. For example, it has been found that when applying an overwrap around a base cup or container, the air gap is substantially eliminated in the seam area formed by the overlapping opposite edges of the overwrap as well as the area 180° removed for the overwrap seam area. This is due to the mechanical clamping which normally occurs during formation of the overwrap container. Such anomaly leads to the formation of a zone opposite the overwrap seam which can make the container or cup uncomfortable or inconvenient to hold relative to the remainder of the holding surface of the container or cup when filled with hot or cold contents.

Accordingly, there remains a need to provide a double walled insulated container which overcomes the shortcomings of previous designs, and creates an overwrap container with a more uniform air gap between the inner and outer walls of the container when measured away from the overwrap seam so as to ensure comfort of the holder of the overwrap container substantially around its outer periphery. In addition, it is desirable to provide a method of and an apparatus for forming such an overwrap container.

SUMMARY

The present disclosure relates to a method for forming an overwrap container. The method includes the steps of a) providing a base container having a first side seam on a side wall that extends along a longitudinal axis to define an internal volume, and a bottom secured to the side wall; b) providing the side wall of the base container with connecting elements around an outer periphery of the side wall; c) providing an overwrap having a second side seam over the side wall of the base container such that the overwrap is joined in spaced apart relationship by the connecting elements to the side wall of the base container; d) clamping the overwrap to the base container along the second side seam to form a first compressed area; e) clamping the overwrap to the base container in an area 180° removed from the second side seam to form a second compressed area; and f) reforming the second compressed area to define an overwrap container having a substantially uniform spacing and air gap between the base container and the overwrap except in the first compressed area.

The present disclosure also relates to an apparatus for producing an overwrap container. The apparatus includes a first mechanized arrangement configured to provide a base container having a side wall and a bottom connected thereto, the sidewall being formed with a first side seam extending longitudinally thereof. A second mechanized arrangement is connected with the first mechanized arrangement and is configured to provide a set of connecting elements on the side wall of the base container, and is configured to position an overwrap having a second side seam around the side wall of the base container such that the side wall of the base container is joined in spaced apart relationship to the overwrap. The second mechanized arrangement includes clamping apparatus configured to clamp the overwrap to the base container along the second side seam to form a first compressed area, and to clamp the overwrap to the base container in an area 180° removed from the second side seam to form a second compressed area. The second mechanized arrangement further includes a reforming arrangement reforming the second compressed area to define an overwrap container having a substantially uniform spacing and air gap between the overwrap and the base container except in the first compressed area.

The present disclosure further relates to a method for forming an overwrap container. The method includes the steps of a) providing a base container having a first side seam on a side wall that extends along a longitudinal axis to define an internal volume, and a bottom secured to the side wall; b) providing the side wall of the base container with connecting elements around an outer periphery of the side wall except for an adhesive-free area at a location along the side wall of the base container reserved for clamping; c) providing an overwrap having a second side seam over the side wall of the base container such that the second side seam is in an area 180° removed from the adhesive-free area, and such that the overwrap is joined in spaced apart relationship by the connecting elements to the side wall of the base container except in the adhesive-free area along the side wall of the base container; d) clamping the overwrap to the base container along the second side seam to form a first compressed area; e) clamping the overwrap to the base container in the area 180° removed from the second side seam and coextensive with the adhesive-free area to form a second compressed area; and f) reforming the second compressed area to define an overwrap container having a substantially uniform spacing and air gap between the base container and the overwrap except in the first compressed area.

The present disclosure additionally relates to an apparatus for producing an overwrap container. The apparatus includes a first mechanized arrangement configured to provide a base container having a side wall and a bottom connected thereto, the sidewall being formed with a first side seam extending longitudinally thereof. A second mechanized arrangement is connected with the first mechanized arrangement and is configured to provide a set of connecting elements on the side wall of the base container except for an adhesive-free area at a location along the side wall of the base container reserved for clamping, and is configured to position an overwrap having a second side seam around the side wall of the base container such that the second side seam is in an area 180° removed from the adhesive-free area, and such that the side wall of the base container is joined in spaced apart relationship to the overwrap except in the adhesive-free area along the side wall of the base container. The second mechanized arrangement includes clamping apparatus configured to clamp the overwrap to the base container along the second side seam to form a first compressed area, and to clamp the overwrap to the base container in the area 180° removed from the second side seam and coextensive with the adhesive-free area to form a second compressed area. The second mechanized arrangement further includes a reforming arrangement reforming the second compressed area to define an overwrap container having a substantially uniform spacing and air gap between the overwrap and the base container except in the first compressed area.

BRIEF DESCRIPTION OF THE DRAWINGS

The drawings illustrate the best mode presently contemplated of carrying out the disclosure.

In the drawings.

DETAILED DESCRIPTION OF THE DRAWINGS

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
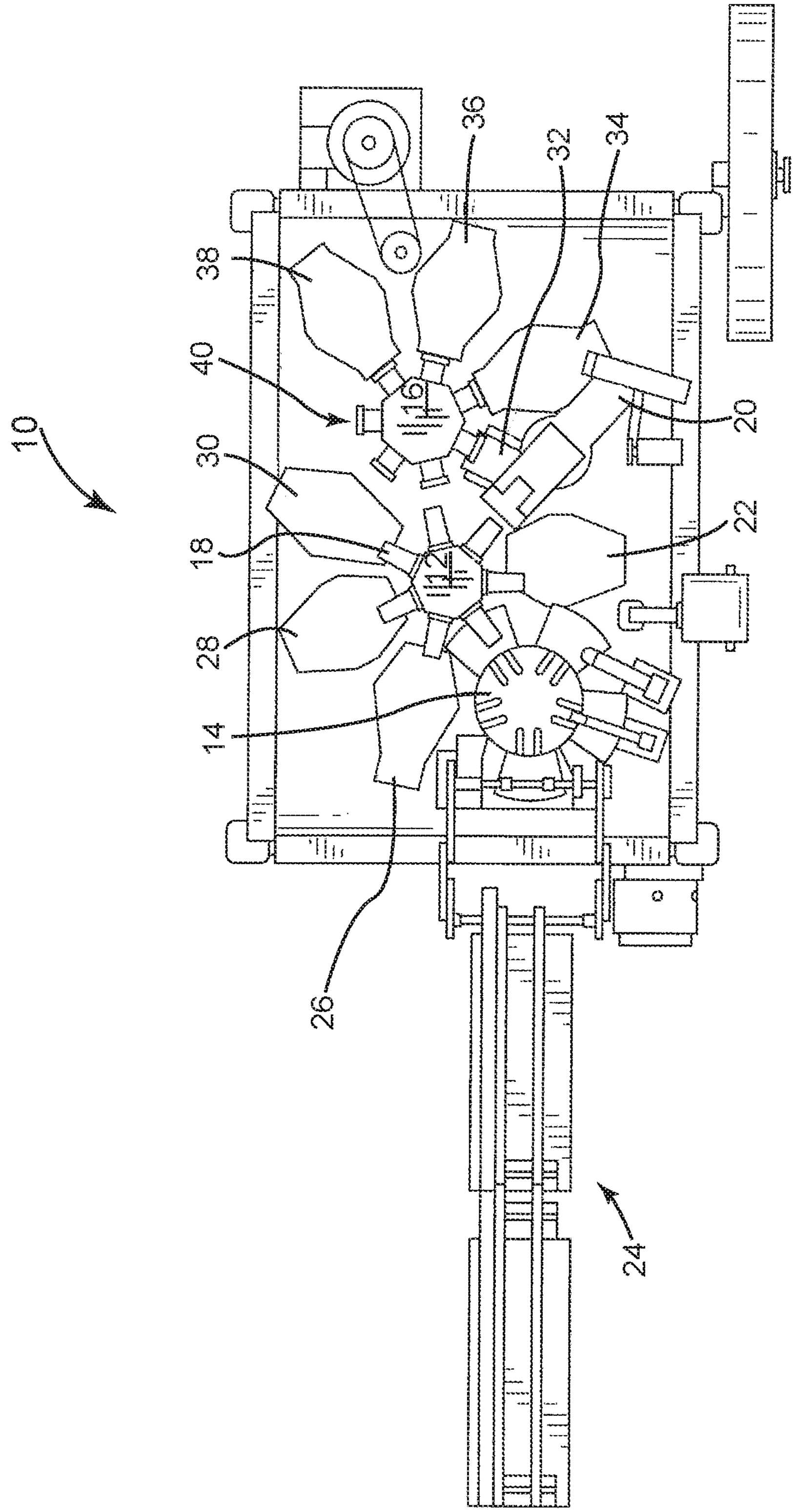
FIG. 1 is a schematic plan view of a cup making machine for making a base container or cup forming part of an overwrap container.

Referring generally to FIG. 1, an exemplary cup making machine or apparatus 10 is illustrated. This particular design includes a mandrel turret 12 which cooperates with a transfer turret 14 and a rimming turret 16. Mandrel turret 12 includes a plurality of frusto-conical mandrels 18 that are rotated in a stepwise or indexing manner between surrounding work stations. For example, a bottom blank may be applied to a given mandrel 18 at a bottom maker station 20 and then rotated to a bottom reformer station 22. From this point, the mandrel 18 is rotated into cooperation with the transfer turret 14 which receives generally trapezoidally shaped side wall blanks from a hopper 24, and rotates each side wall blank into cooperation with the cooperating mandrel 18. The side wall blank is then folded about the mandrel 18 over the bottom blank, heated and sealed along a seam.

Next, the bottom blank and the side wall blank are rotated to a bottom heat station 26. After heating, mandrel turret 12 indexes the subject mandrel 18 to a roller incurl station 28 where a portion of the side wall blank, i.e. a side wall blank flap, is bent over an outer lip of the bottom blank to form a recessed bottom in the cup. The cup is then moved to a bottom finishing station 30 where the side wall blank flap and the bottom blank lip are pressed against the lower region of the side wall blank to form a seal.

Figure 2:
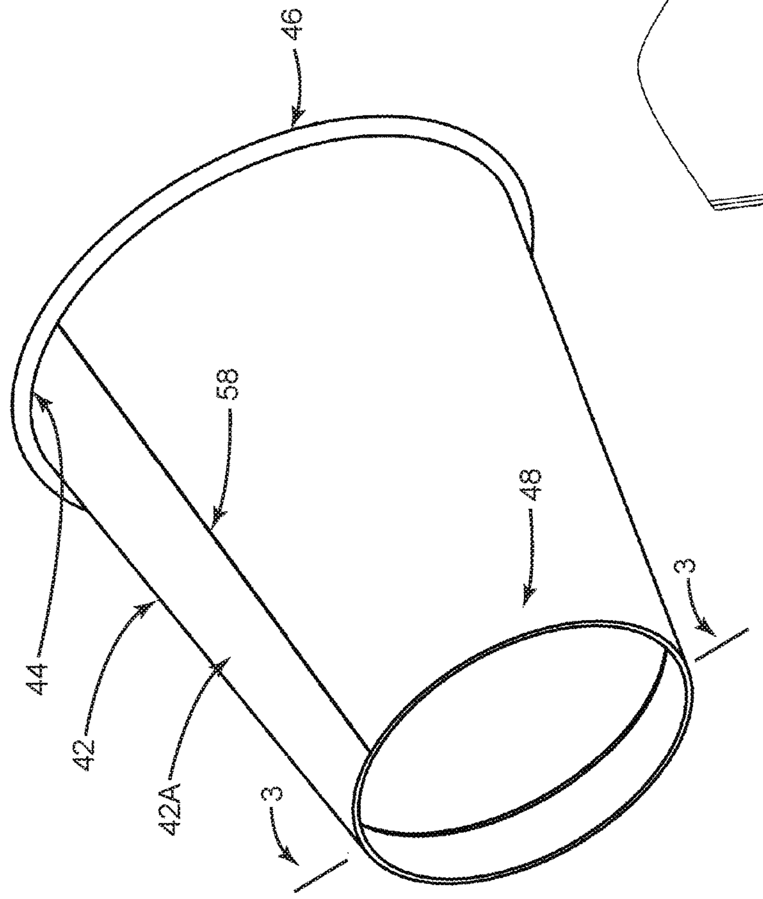
FIG. 2 is a bottom perspective view of a base container or cup produced from the machine shown in FIG. 1.

Once the bottom is formed and sealed, the cup is transferred to rimming turret 16 and rotated to a lube station 32 and then to a rimming precurl station 34 where the upper lip of the side wall is curled outwardly. From that station, the cup is indexed to a rimming finish curl station 36 which finishes the curled portion along the top of the cup to make an attractive edge. At this point, the cup may be moved to an optional lid groover station 38 and then to a cup blowout station 40 for removal of the finished cup depicted in FIG. 2 as a base container or cup 42 with a side wall 42A that extends about a longitudinal axis to define an internal volume.

The base container or cup 42 includes an upper region 44 having a curled rim 46 and a bottom region 48. Cup 42 is made from a side wall blank 50 disposed generally transverse thereto. A bottom blank 52 is typically bent or folded over in proximity to its outer edge to form a lip 54. The side wall blank 50 is located with respect to bottom blank 52 so that a flap portion 56 extends beyond lip 54. Flap portion 56 is bent or folded around lip 54 so lip 54 may be squeezed between flap portion 56 and a lower portion 57 of side wall blank 50 (see FIG. 3).

Figure 3:
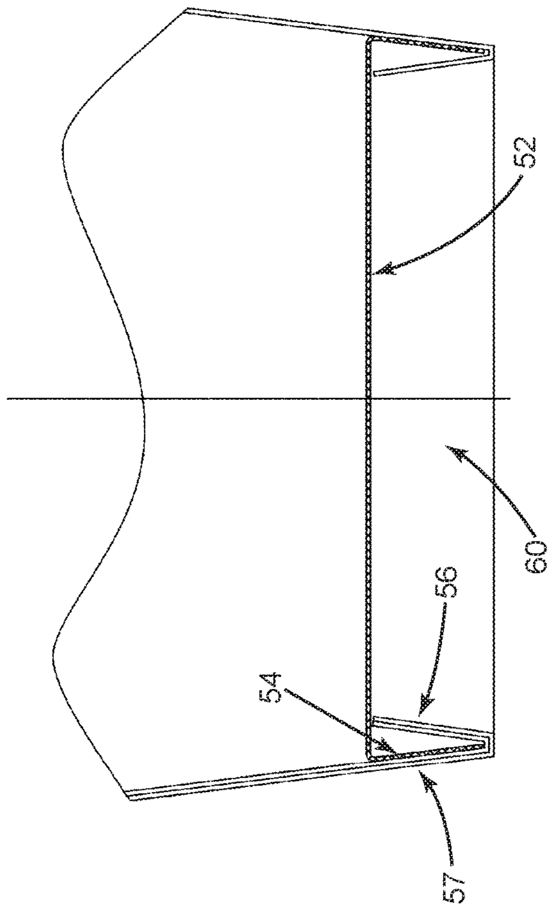
FIG. 3 is a sectional view taken on line 3-3 of FIG. 2.

The base container or cup 42 is typically made from paperboard blanks having a thermoplastic coating such as polyethylene. The thermoplastic material permits heating and sealing of adjacent components. For example, when side wall blank 50 is wrapped around bottom blank 52, the adjacent edges are heated and pressed together along a base cup seam 58. The cup making machine 10 has the ability to create cups 42 with either a left over right seam or a right over left seam. Similarly, lip 54, flap portion 56 and lower portion 57 of side wall blank 50 may be heated and pressed together at bottom finishing station 30 to form a strong, leak-proof bottom region 48. By forming base cup 42 as illustrated in FIG. 3, a recessed area 60 is created in the bottom of cup 42 on an opposite side of blank 52 from the main container region of cup 42. Recessed area 60 in the bottom of the cup permits insertion of a tool to press lip 54 and flap portion 56 towards the lower region 57 of side wall blank 50.

Figure 4:
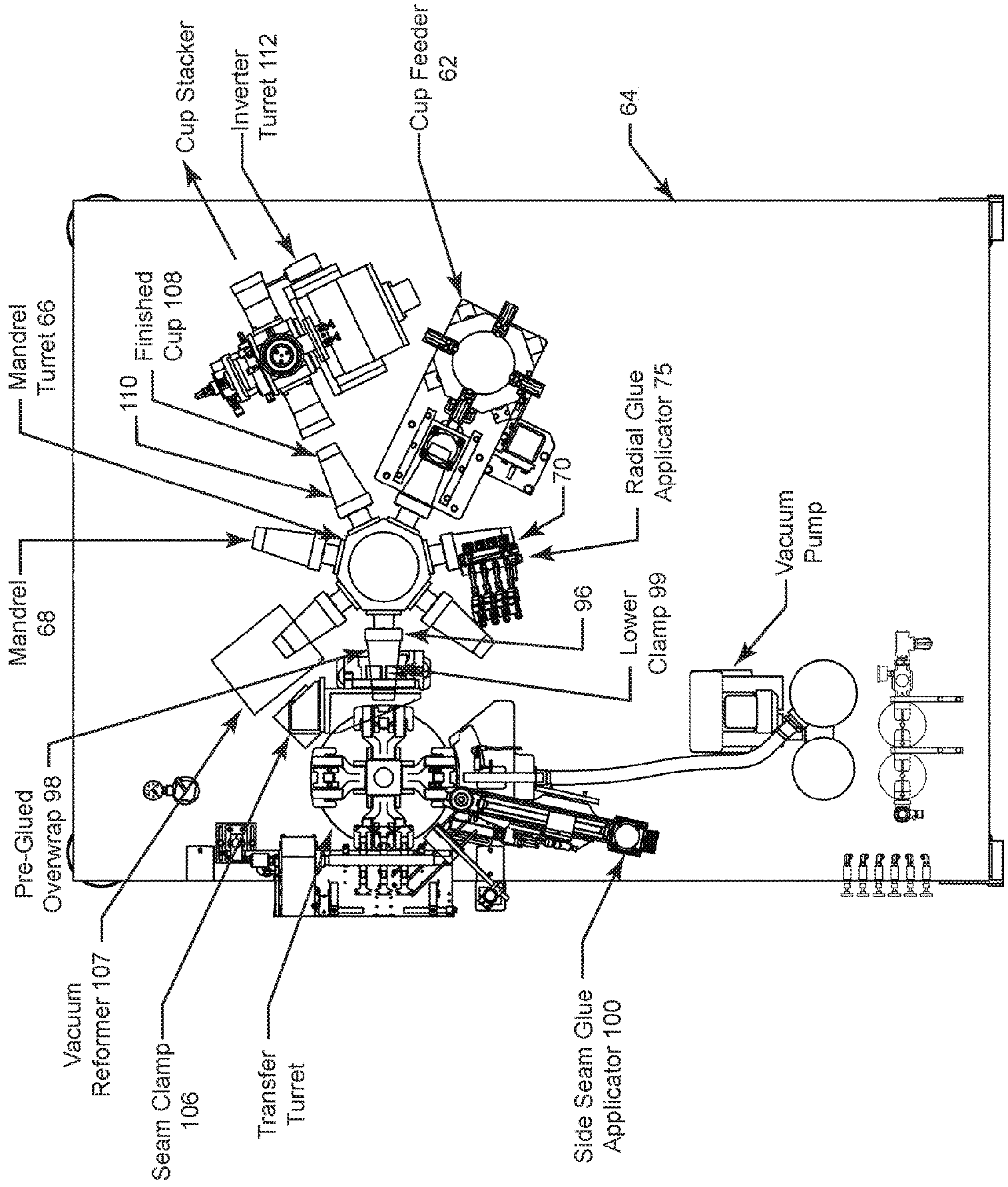
FIG. 4 is a schematic plan view of a cup making machine for applying adhesive elements to the base container or cup and for applying an overwrap thereto.

Referring now to FIG. 4, the base container or cup 42 is then transferred from the first machine apparatus 10 to a feeder 62 on a second machine or apparatus 64. The cup feeder 62 is aligned with a rotatable mandrel turret 66 which includes a plurality of rotary mandrels 68 that are rotated or indexed in a stepwise manner clockwise about a vertical axis to various rotary positions. For example, the finished base container or cup 42 is transferred by the cup feeder 62 onto a mandrel 68. Then the turret 66 is indexed one step to the representative rotary position at 70 where the base container 42 is rotated on the mandrel 68 about an axis perpendicular to the vertical turret axis. At this position, a plurality of spaced apart adhesive elements (such as shown in 74 in FIG. 5) are applied on and at least partially around the outer surface of the side wall 42A of the base container or cup 42. In a typical application, the adhesive elements 74 take the form of a heated glue applied by a radial glue apparatus 75 in elongated beads or ribs which when applied to the basic container 42 protrude outwardly therefrom and extend generally parallel to each other in equally spaced apart relationship. The adhesive elements 74 may take other forms and configurations.

Figure 6:
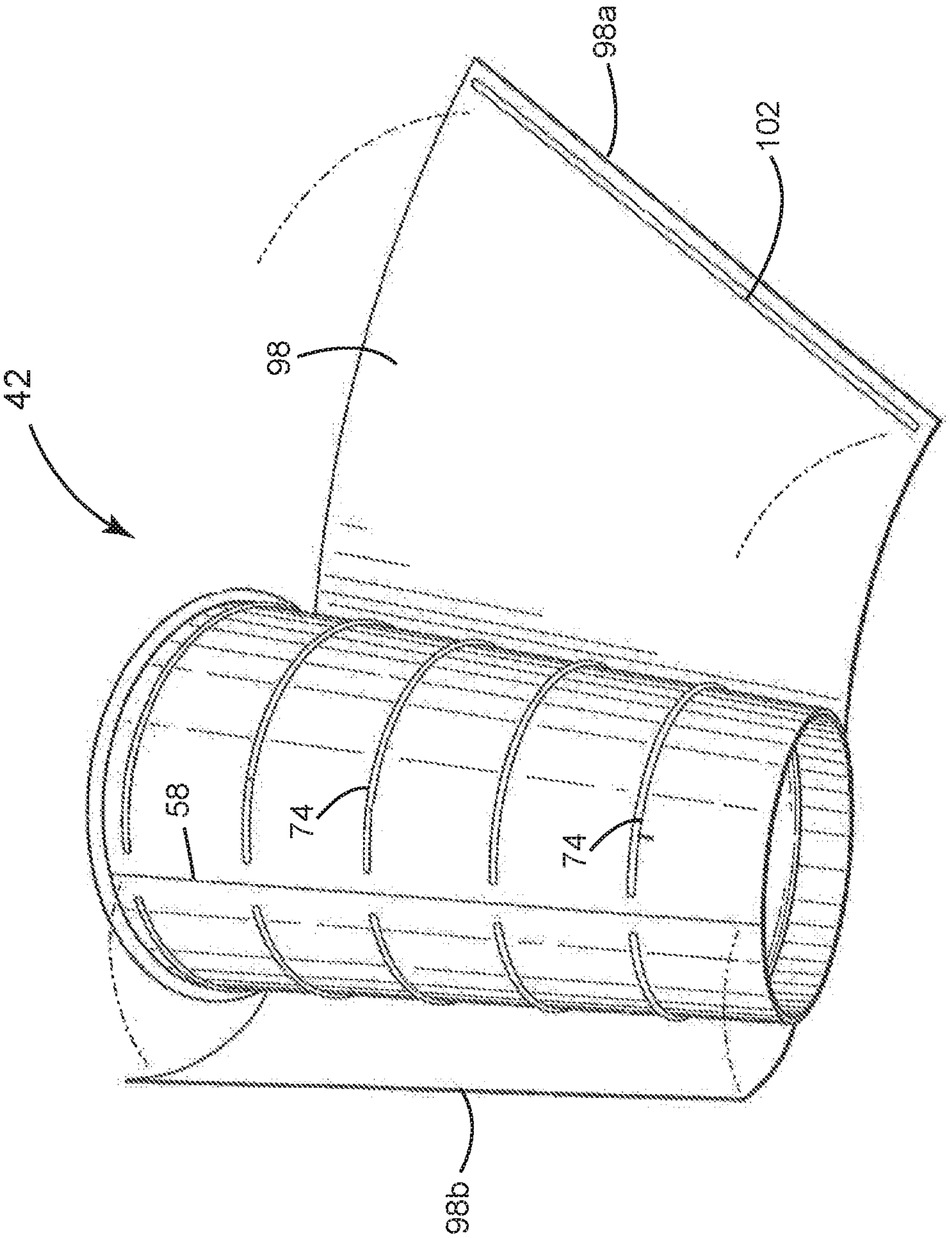
FIG. 6 is a view showing an overwrap about to be placed and secured around the base container or cup.

Once the adhesive elements 74, have been applied, the base container or cup 42 is indexed clockwise to a position at 96 at which a pre-glued overwrap (seen at 98 in FIG. 6) is applied completely around the base container or cup 42 and pressed by a lower clamp 99. The overwrap 98 is a blank formed typically of paperboard, shaped similarly to and sized slightly larger than the side wall blank 50 used in forming the base container or cup 50. The overwrap 98 is sized so that it lies between a top edge and a bottom edge of the base container 42. More particularly, the overwrap 98 has opposite side edges 98*a*, 98*b* one of which is provided by an applicator 100 along its length with an adhesive 102. The overwrap 98 is applied around the side wall 42A of the base container or cup 42 so that the inside surface of the overwrap 98 is connected to and spaced from the outside surface of the base container or cup 42 by means of the adhesive elements 74. At the same time, the edges 98*a*, 98*b* of the overwrap 98 are overlapped and joined or sealed together by the adhesive 102 to form an overwrap side seam 104. In the formation of the overwrap container, it is not necessary that the base cup seam 58 is aligned with the overwrap side seam 104. The forming of the overwrap side seam 104 is made possible by a servo driven seam clamp 106 which applies a pressing or clamping force along the seam 104.

Figure 9:
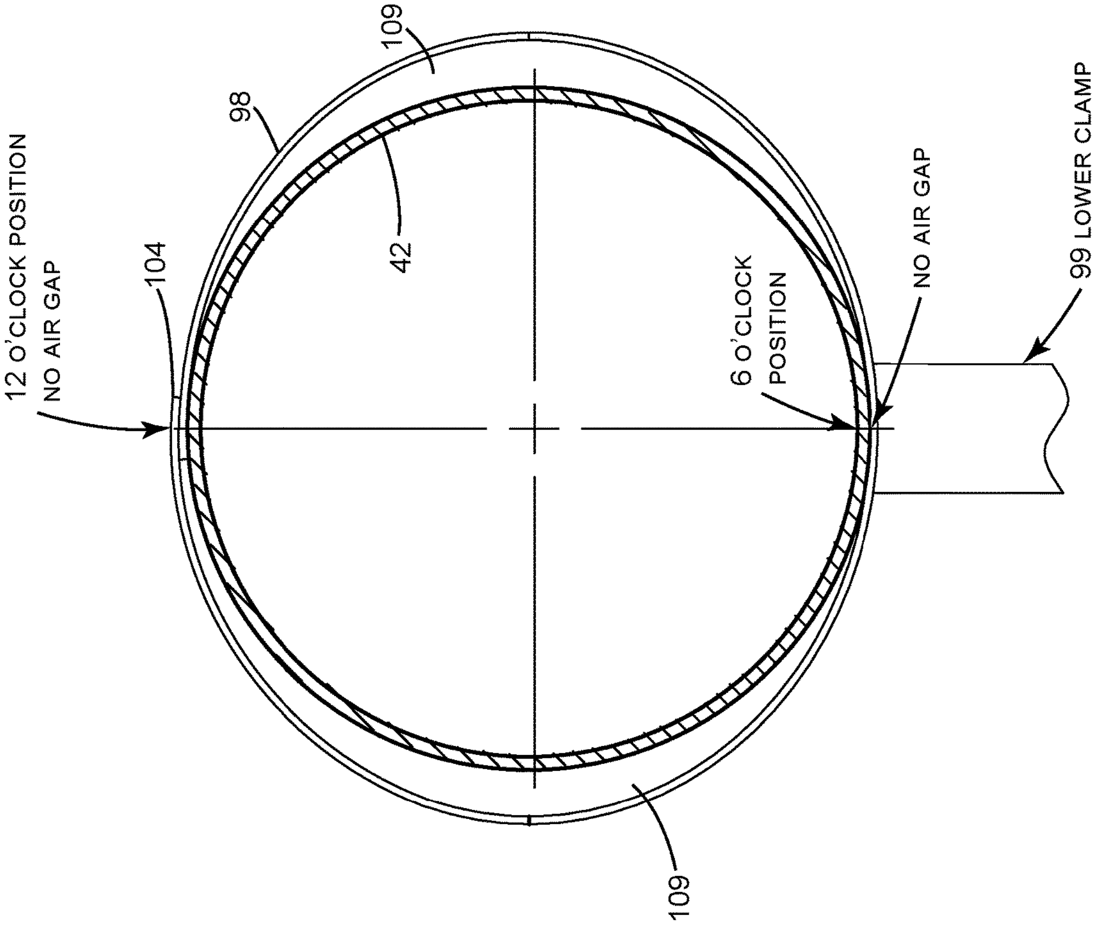
FIG. 9 is a bottom view of a finished overwrap container showing no air gap between the inner and outer walls of the overwrap container at the compressed areas of the overwrap seam and an area diametrically opposed therefrom, and a varying air gap between these compressed areas.

FIG. 9 illustrates an end view of the overwrap container being formed and shows that the overwrap seam 104 has been compressed against the base cup 42 at a 12 o'clock position so that there is no air gap between the overwrap 98 and the base cup 42 at this position. In addition, at the 6 o'clock position (substantially 180° removed from the overwrap seam area), the lower clamp 99 has compressed the overwrap 98 against the base cup 42 to further create no air gap therebetween. Further, it can be seen that a varying air gap 109 is created between the overwrap 98 and the base cup 42 between the 12 o'clock-6 o'clock and 6 o'clock-12 o'clock sectors.

Figure 10:
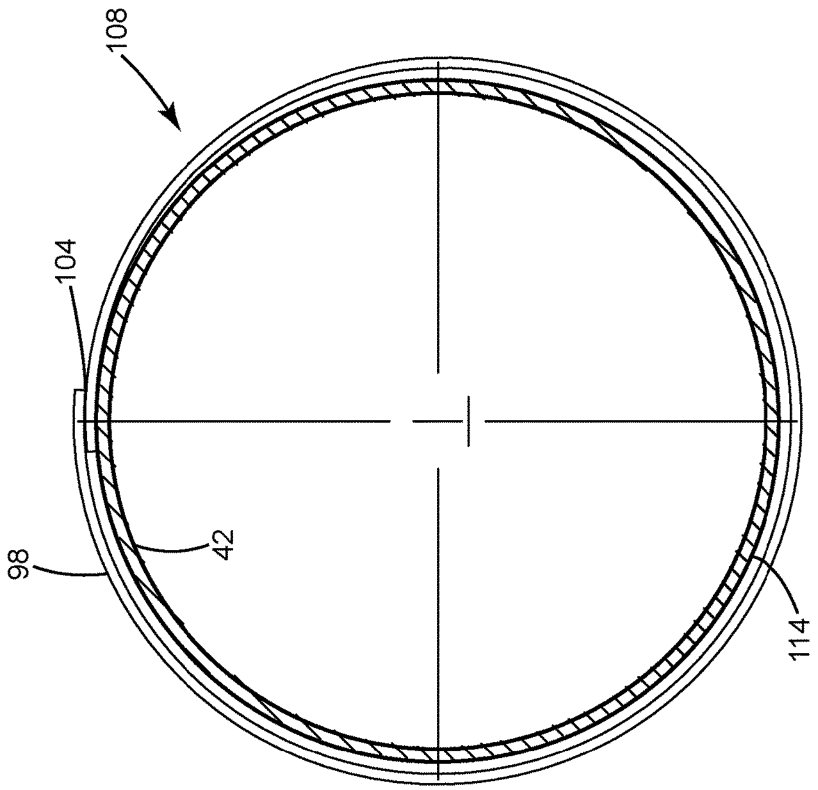
FIG. 10 is a bottom view of a finished overwrap container showing a substantially uniform air gap between the inner and outer walls of the overwrap container except for the compressed overwrap seam area of the overwrap container.

In an effort to create a more substantially uniform air gap between the overwrap 98 and the base cup 42 outside the compressed area of the overwrap seam 104 and the base cup 42, the present disclosure contemplates restoring or reestablishing the air gap at the 6 o'clock position. Accordingly, the overwrap 98 joined to the base cup 42 is indexed by turret 66 to a reforming arrangement in the exemplary form of a vacuum reformer 107 which acts to reform such as by applying vacuum to separate the overwrap 98 from the base cup 42 at the 6 o'clock position. As a result, a substantially uniform air gap 114 is created as seen in FIG. 10 between the overwrap 98 and the base cup 42 except in the overwrap seam area at 104.

The present disclosure envisions that the vacuum reformer 107 may take different forms. In a first option, this will be a vacuum bar that is mechanically moved to meet the container in the compressed 6 o'clock location. Vacuum will be established with the overwrap, and the bar will be moved perpendicular to the cup center line, pulling the overwrap with it, hence, reestablishing the air gap. In a second option, at the vacuum reformer position shown in FIG. 4, the overwrap container will be transferred from the mandrel 68 to a pocket device. Vacuum in this pocket device will reshape the overwrap container, hence, reestablishing the air gap at the lower clamp position.

Figure 8:
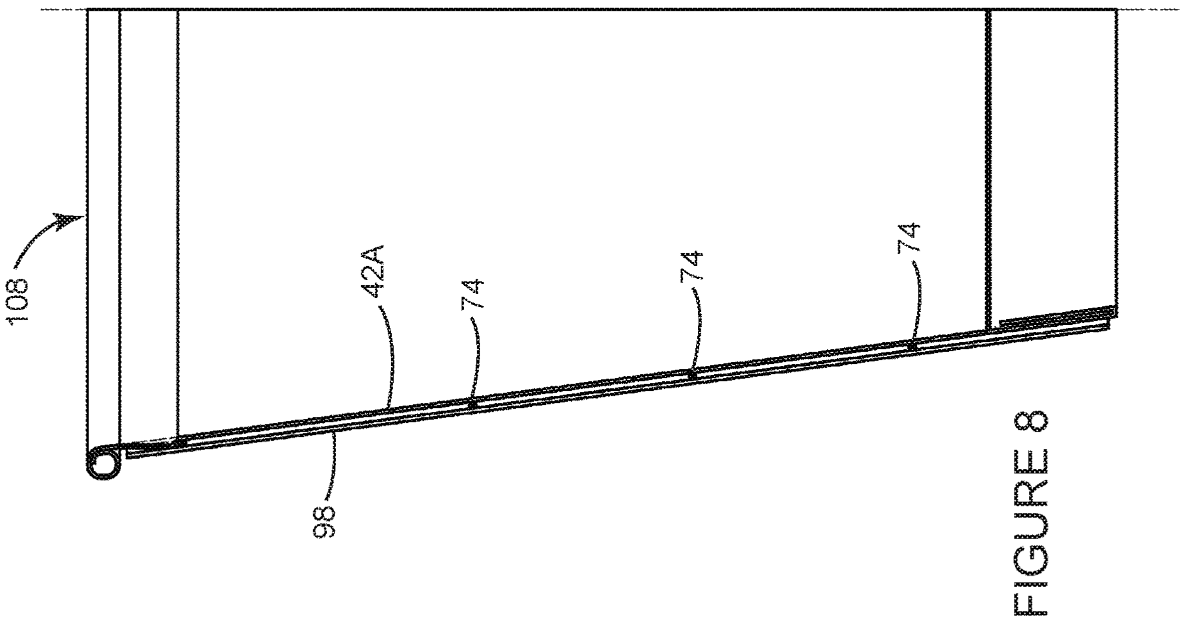
FIG. 8 is a sectional view taken on line 8-8 of FIG. 7 showing the adhesive elements between the base container or cup and the overwrap.
Figure 7:
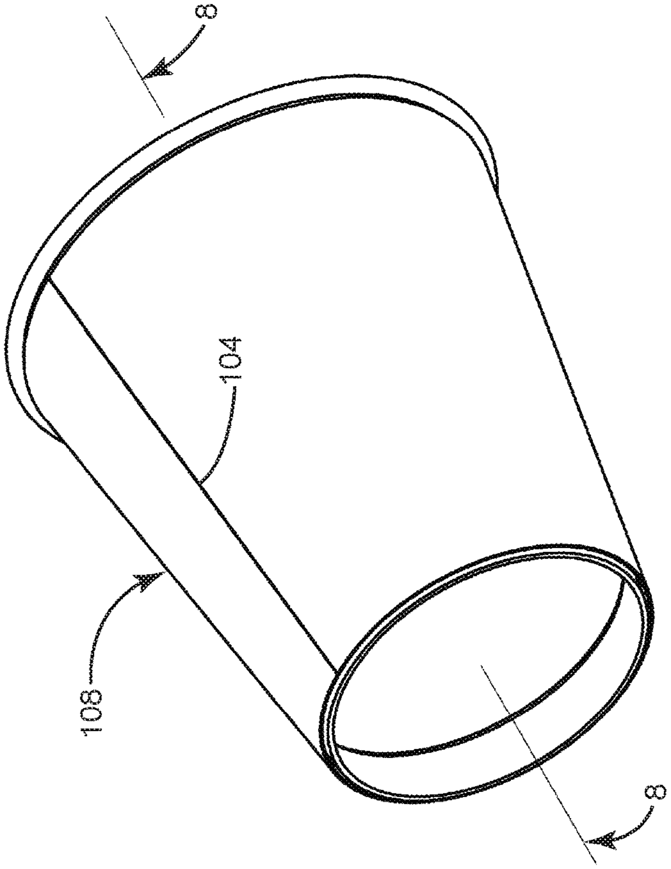
FIG. 7 is a bottom perspective view of a finished overwrap container.

With the vacuum as applied in the first option described above, a finished overwrap container 108 is formed and is indexed by the turret 66 to a position at 110. Here, the finished overwrap container 108 is blown off into a pocket of a second inverter turret 112 which is indexed to blow the overwrap container 108 to a cup stacker (not shown). The exemplary overwrap container 108 (FIGS. 7 and 8) has a frusto-conical shape with an open top and a closed bottom end. However, the present disclosure contemplates that the base container 42 and the overwrap 98 may be otherwise formed to provide a differently shaped overwrap container 108.

In the completed overwrap container 108, the base container or cup 42 forms an inner wall, and the overwrap 98 forms an outer wall, the inner and outer walls defining a double walled container. The inner and outer walls are connected together by the adhesive elements 74. However, the adhesive elements 74 function to space the inner and outer walls 42, 98 from each other. Thus, the adhesive elements 74, serve as both connecting and spacing elements.

It is important to note that the particular application of the adhesive elements 74, permit the connection of the overwrap 98 to the base container or cup 42. However, the adhesive elements 74, permit spacing of the overwrap 98 from the base container or cup 42 around the periphery thereof so that the substantially uniform air gap 114 extends between the overwrap 98 and the base container or cup 42 as seen in FIG. 10. The creation and maintenance of such a uniform air gap 114 improves over the prior art by providing an overwrap container 108 which is comfortable and convenient to hold around substantially the entire periphery of the container 108.

Figure 5A:
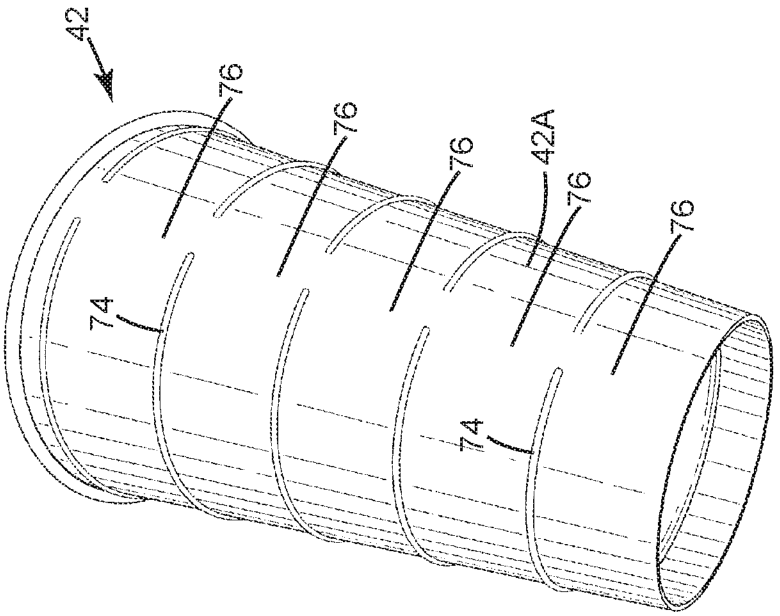
FIG. 5A is a view similar to FIG. 5 showing another embodiment of an overwrap container.
Figure 5:
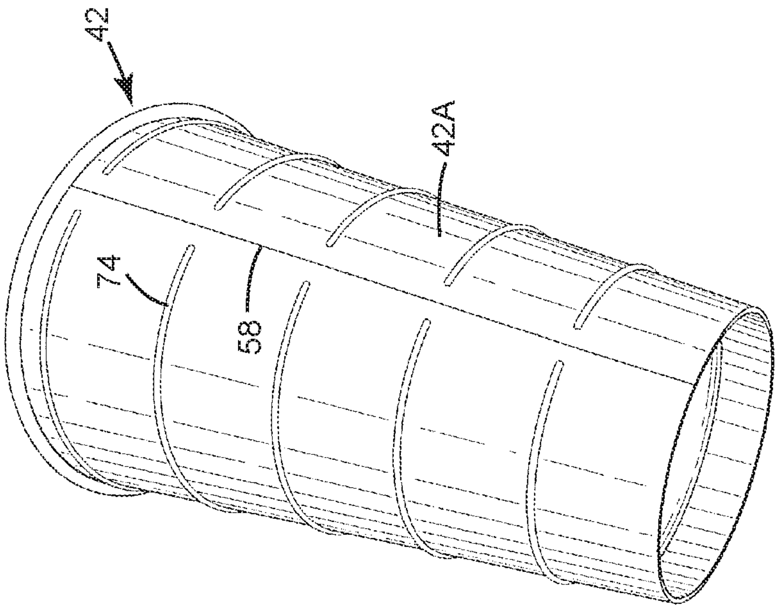
FIG. 5 is a view similar to FIG. 2 showing adhesive elements applied to the base container or cup.
Figure 6A:
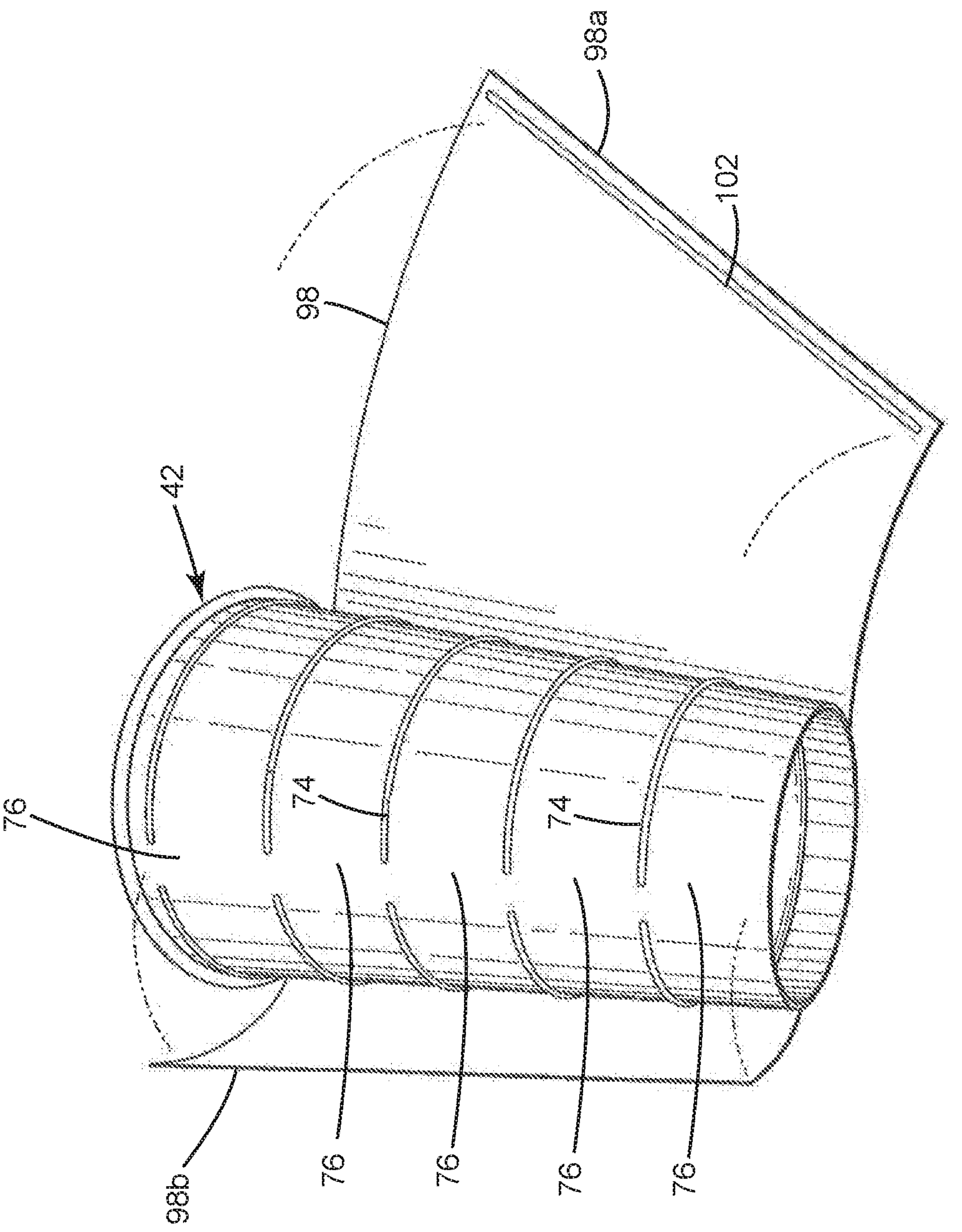
FIG. 6A is a view similar to FIG. 6 showing the embodiment of FIG. 5A.

In another embodiment of overwrap container 108 using the base cup 42 shown in FIGS. 5A and 6A, the adhesive elements 74 are applied on and at least partially around the outer surface of the side wall 42A except for an adhesive-free area 76 extending longitudinally along the entire length of the base cup 42 which is left blank (i.e. without adhesive), and which is designated or reserved for clamping during formation of the overwrap container. In this embodiment, at the 6 o'clock position, the lower clamp 99 has compressed the overwrap 98 against the base cup 42 along the length thereof in the area 76 devoid of adhesive to further create no air gap therebetween. The overwrap container is formed as described above using vacuum to produce the substantially uniform air gap 114 as seen in FIG. 10 between the overwrap 98 and the base cup 42 except in the overwrap seam area at 104. In this overwrap container 108, the inner and outer walls 42, 98 are connected together by the adhesive elements 74 except in the area 76 which is adhesive-free.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for forming an overwrap container, the method comprising the steps of:

a) providing a base container having a first side seam on a side wall that extends along a longitudinal axis to define an internal volume, and a bottom secured to the side wall;

b) providing the side wall of the base container with connecting elements on an outer periphery of the side wall;

c) providing an overwrap having a second side seam over the side wall of the base container such that the overwrap is joined in spaced apart relationship by the connecting elements to the side wall of the base container;

d) clamping the overwrap to the base container along the second side seam to form a first compressed area;

e) clamping the overwrap to the base container in an area spaced 180° from the second side seam to form a second compressed area; and f) applying a vacuum to the overwrap along the second compressed area to separate the overwrap from the side wall of the base container to reproduce the spaced apart relationship between the side wall of the base container and the overwrap at the second compressed area to define an overwrap container having a substantially uniform spacing and air gap between the base container and the overwrap except in the first compressed area.

2. The method of claim 1, wherein the step b) includes applying a plurality of elongated adhesive beads protruding outwardly from the outer periphery of the side wall of the base container.

3. The method of claim 2, wherein the adhesive beads are applied with heated glue.

4. The method of claim 2, wherein the adhesive beads are formed generally parallel to each other.

5. The method of claim 1, wherein step c) includes overlapping opposite side edges of the overwrap and sealing the overlapped side edges together to form the second side seam.

6. The method of claim 1, wherein the connecting elements applied in step b) are absent along the complete length of the first side seam.

7. A method for forming an overwrap container, the method comprising the steps of:

a) providing a base container having a first side seam on a side wall that extends along a longitudinal axis to define an internal volume, and a bottom secured to the side wall;

b) providing the side wall of the base container with connecting elements on an outer periphery of the side wall except for an adhesive-free area at a location along the side wall of the base container reserved for clamping;

c) providing an overwrap having a second side seam over the side wall of the base container such that the second side seam is in an area 180° from the adhesive-free area, and such that the overwrap is joined in spaced apart relationship by the connecting elements to the side wall of the base container except in the adhesive-free area along the side wall of the base container;

d) clamping the overwrap to the base container along the second side seam to form a first compressed area;

e) clamping the overwrap to the base container in the area spaced 180° from the second side seam and coextensive with the adhesive-free area to form a second compressed area; and f) applying a vacuum to the overwrap along the second compressed area to separate the overwrap from the side wall of the base container to reproduce the spaced apart relationship between the side wall of the base container and the overwrap at the second compressed area to define an overwrap container having a substantially uniform spacing and air gap between the base container and the overwrap except in the first compressed area.

8. The method of claim 7, wherein the step b) includes applying a plurality of elongated adhesive beads protruding outwardly from the outer periphery of the side wall of the base container.

9. The method of claim 8, wherein the adhesive beads are applied with heated glue.

10. The method of claim 8, wherein the adhesive beads are formed generally parallel to each other.

11. The method of claim 7, wherein step c) includes overlapping opposite side edges of the overwrap and sealing the overlapped side edges together to form the second side seam.

* * * * *